United States Patent [19]
Uwabo et al.

[11] Patent Number: 5,875,077
[45] Date of Patent: Feb. 23, 1999

[54] SERVO WRITER FOR A LARGE CAPACITY FLOPPY DISK HAVING AN INTEGRATED DIRECT-ACTING HEAD CARRIAGE AND ACTUATOR

[75] Inventors: Tsuneo Uwabo, Hachiouji; Yoshihiro Okano; Eiichi Yoneyama, both of Atsugi; Yoshinori Tangi, Hachiouji, all of Japan

[73] Assignee: Mitsumi Electric Co., Ltd., Tokyo, Japan

[21] Appl. No.: 857,782

[22] Filed: May 16, 1997

[30] Foreign Application Priority Data

May 27, 1996 [JP] Japan .................................. 8-132189

[51] Int. Cl.⁶ ........................................ G11B 5/55
[52] U.S. Cl. ............................................. 360/106
[58] Field of Search ...................... 360/104, 106

[56] References Cited

U.S. PATENT DOCUMENTS 5,463,512 10/1995 Hashimoto .............................. 360/104

*Primary Examiner*—A. J. Heinz
*Attorney, Agent, or Firm*—Frishauf, Holtz, Goodman, Langer & Chick

[57] ABSTRACT

In a servo writer for writing servo data on a magnetic disk medium of a large-capacity flexible disk using a magnetic head, the servo writer includes a direct-acting head carriage for supporting the magnetic head. The direct-acting head carriage is used in a high-density type flexible disk drive for carrying out data recoding and reproducing operations to and from the magnetic disk medium of the large-capacity flexible disk. A connection rod integrates the direct-acting head carriage with an actuator of the servo writer.

6 Claims, 5 Drawing Sheets

SERVO WRITER FOR A LARGE CAPACITY FLOPPY DISK HAVING AN INTEGRATED DIRECT-ACTING HEAD CARRIAGE AND ACTUATOR

BACKGROUND OF THE INVENTION

This invention relates to a method of writing servo data on a magnetic disk medium such as a large-capacity flexible or floppy disk by a magnetic head and a servo writer for the large-capacity flexible or floppy disk.

As is well known in the art, a flexible or floppy disk drive (which may be abbreviated to "FDD") is a device for carrying out data recording and reproducing operations to and from a magnetic disk medium such as a flexible or floppy disk (which may be abbreviated to "FD") inserted therein. In recent years, FDs have been more and more improved to have a greater capacity. Specifically, development has been made of FDs having a storage capacity of 128 Mbytes (which may be called large-capacity FDs) in contrast with FDs having a storage capacity of 1 Mbyte or 2 Mbytes (which may be called small-capacity FDs). Following such development, the FDDs have also improved to accept the large-capacity FDs for data recording and reproducing operations to and from the magnetic disk media of the large-capacity FDs.

Throughout the present specification, FDDs capable of recording/reproducing data for magnetic disk media of the large-capacity FDs alone will be referred to as high-density exclusive type FDDs. On the other hand, FDDs capable of recording/reproducing data for magnetic disk media of the small-capacity FDs alone will be called low-density exclusive type FDDs. Furthermore, FDDs capable of recording/reproducing data for magnetic disk media of both the large-capacity and the small-capacity FDs will be called high-density/low-density compatible type FDDs. In addition, the high-density exclusive type FDDs and the high-density/low-density compatible type FDDs will collectively be called high-density type FDDs.

The low-density exclusive type FDD and the high-density type FDD are different in mechanism from each other in several respects, one of which will presently be described. In either FDD, a magnetic head is supported by a head carriage which is driven by a drive arrangement to move in a predetermined radial direction with respect to the magnetic disk medium of the FD inserted in the FDD. The difference resides in the structure of the drive arrangement. More specifically, the low-density exclusive type FDD uses a stepping motor as the drive arrangement. On the other hand, the high-density type FDD uses a linear motor such as a voice coil motor (which may be abbreviated to "VCM") as the drive arrangement.

Now, description will be made of the voice coil motor used as the drive arrangement in the high-density type FDD. The voice coil motor comprises a voice coil and a magnetic circuit. The voice coil is disposed on the head carriage at a rear side and is wound around a drive axis extending in parallel to the predetermined radial direction. The magnetic circuit generates a magnetic field in a direction intersecting that of an electric current flowing through the voice coil. With this structure, by causing the electric current to flow through the voice coil in a direction intersecting that of the magnetic field generated by the magnetic circuit, a drive force occurs in a direction extending to the drive axis on the basis of interaction of the electric current with the magnetic field. The drive force causes the voice coil motor to move the head carriage in the predetermined radial direction. Throughout the present specification, the head carriage driven linearly by such a linear motor will be called a direct-acting head carriage.

In the meanwhile, the large-capacity FD generally has an external configuration which is substantially identical with that of the small-capacity FD. Specifically, both of the large-capacity and the small-capacity FDs have a flat rectangular shape with a width of 90 mm, a length of 94 mm, and a thickness of 3.3 mm in the case of a 3.5-inch type FD. As is well known in the art, the FD comprises a disk-shaped magnetic disk medium covered with a case which is called a shell. The case consists of an upper case and a lower case with the magnetic disk medium sandwiched therebetween. The upper and the lower cases have upper and lower openings, respectively. The magnetic disk medium of the FD is accessed by upper and lower magnetic heads via the upper and the lower openings. The magnetic disk medium of the FD has both sides on which a plurality of tracks are concentrically disposed along a radial direction. The magnetic disk medium of the large-capacity FD has a track width (track pitch) which is narrower than that of the magnetic disk medium of the small-capacity FD. Inasmuch as the magnetic disk medium of the large-capacity FD has a narrower track width (track pitch), servo data for position detection is preliminarily written on the magnetic disk medium of the small-capacity FD.

As is well known in the art, the small-capacity FD is sold in two forms as follows. In a first form, the small-capacity FD is sold with an unformatted, unitialized disk medium. In a second form, the small-capacity FD is sold with a formatted disk medium whereby an unformatted disk medium is formatted by a formatter. On buying the small-capacity FD with the unformatted disk medium, a user carries out writing/reading of data in/from the magnetic disk medium after the unformatted disk medium is initialized or formatted. On the other hand, on buying the small-capacity FD with the formatted disk medium, a user can immediately carry out writing/reading of data in/from the magnetic disk medium without initialization or formatting.

In contrast with this, the large-capacity FD is sold in two forms as follows. In a first forms, the large-capacity FD is sold with a servo-formatted disk medium whereby an unformatted disk medium is servo-formatted by a servo writer (or servo data is written in the unformatted disk medium). In a second form, the large-capacity FD is sold with a data-formatted disk medium whereby the servo-formatted disk medium is data-formatted by a formatter. On buying the large-capacity FD with the servo-formatted disk medium, a user carries out writing/reading of data in/from the magnetic disk medium after the servo-formatted disk medium is data-formatted by the formatter. On the other hand, on buying the large-capacity FD with the data-formatted disk medium, a user can immediately carry out writing/reading of data in/from the magnetic disk medium without data-formatting. In servo-format using the servo writer, the servo writer constructs the tracks on the unformatted disk medium at a track pitch of about 10 $\mu$m, partitions each track into a plurality of sectors, and writes position information for the tracks and the sectors on the magnetic disk medium. The servo writer may be called a servo track writer.

In order to write the servo data on the unformatted disk medium of the large-capacity FD, a conventional servo writer uses, as a drive mechanism, a head carriage into which a head gimbal assembly (HGA) used in a hard disk drive (HDD) is modified and writes the serve data on the magnetic disk medium by the magnetic head with a load/unload mechanism for the magnetic head set outside. The unformatted disk medium is rotatably supported by a spindle via an air bearing. The conventional servo writer can directly write the servo data on the unformatted disk medium without the case (shell).

As is well known in the art, in the hard disk drive, the magnetic head is supported by a supporting spring (load arm) in a suspension fashion. The magnetic head consists of a core for recording information on a hard magnetic disk medium of a hard disk and a slider for having the core surface with an extremely narrow gap (which is called a spacing) left between the hard magnetic disk medium and the core. Such a magnetic head is called a monolithic head. In the hard disk drive, it is not presumed that a recording medium moves up and down on rotating of the recording medium. This is because the hard magnetic disk medium is used as the recording medium for the hard disk drive.

It is assumed that the recording medium presents flexibility like the flexible magnetic disk medium of the flexible disk. In the above-mentioned supporting structure (the head gimbal assembly) for magnetic heads in the hard disk drive, a position of a pair of upper and lower magnetic heads shifts from a desired track position on the recording medium. In other words, in a case where the head carriage for the servo writer is one into which the head gimbal assembly used in the hard disk drive is modified, it is very difficult to select and adjust the magnetic heads because of adverse effect of balance of the pair of upper and lower magnetic heads. A yield factor in the magnetic head is degraded and the magnetic head becomes expensive. When a load of the head gimbal assembly is not balanced, modulation occurs due to corrugation of the flexible magnetic disk medium. As a result, it is impossible to write the servo data on the flexible magnetic disk medium.

Furthermore, inasmuch as the head gimbal assembly is particularly processed to enable loading and unloading, the rigidity of a connection rod for mounting the head gimbal assembly must be improved and this results in degraded mechanical characteristics of the serve writer from the point of view of mass.

SUMMARY OF THE INVENTION

It is therefore an object of this invention to provide a servo data writing method and a servo writer for a large-capacity FD/ which is capable of to stably writing servo data on a magnetic disk medium of the large-capacity FD.

Other objects of this invention will become clear as the description proceeds.

A method to which this invention is applicable is the writing of servo data on a magnetic disk medium of a large-capacity flexible disk using a magnetic head. The magnetic disk medium of the large-capacity flexible disk has a track width which is narrower than that of a magnetic disk medium of a small-capacity flexible disk. According to an aspect of this invention, the method comprises the steps of using, as a head carriage for supporting the magnetic head, a direct-acting head carriage driven by a linear motor, the direct-acting head carriage being used in a high-density type flexible disk drive for carrying out data recoding and reproducing operations to and from the magnetic disk medium of the large-capacity flexible disk; integrating the direct-acting head carriage with an actuator of a servo writer by a connection rod to form an integrated direct-acting head carriage and actuator; and writing the servo data on the magnetic disk medium using the integrated direct-acting head carriage and actuator.

A servo writer to which this invention is applicable is for writing servo data on a magnetic disk medium of a large-capacity flexible disk using a magnetic head. The magnetic disk medium of the large-capacity flexible disk has a track width which is narrower than that of a magnetic disk medium of a small-capacity flexible disk. According to another aspect of this invention, the servo writer comprises a direct-acting head carriage driven by a linear motor for supporting the magnetic head. The direct-acting head carriage is used in a high-density type flexible disk drive for carrying out data recoding and reproducing operations to and from the magnetic disk medium of the large-capacity flexible disk. A connection rod integrates the direct-acting head carriage with an actuator of the servo writer.

DESCRIPTION OF THE PREFERRED EMBODIMENTS

Figure 1:
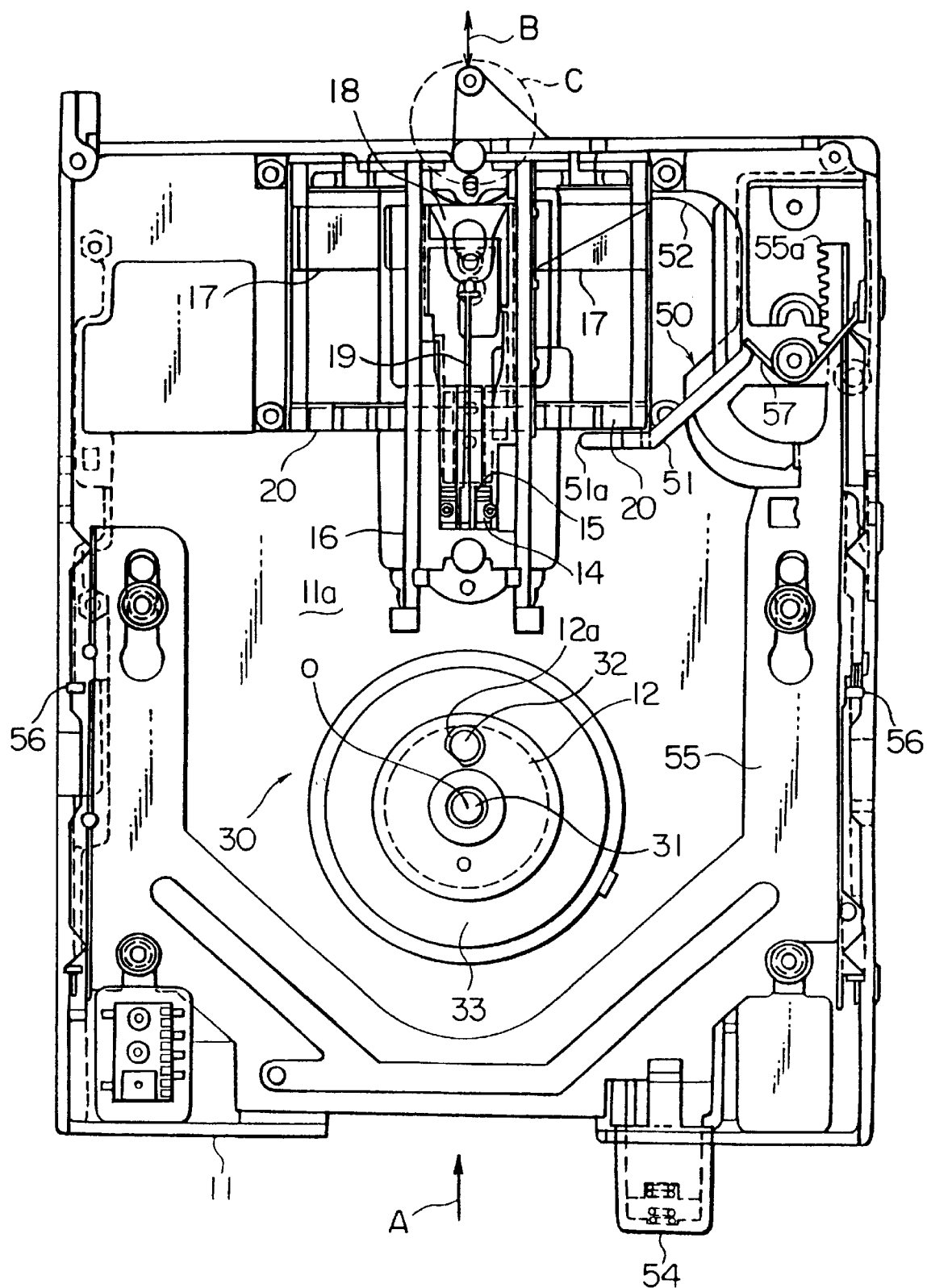
FIG. 1 is a plan view of a high-density type flexible disk drive which is used as a component of a servo writer according to this invention.

Referring to FIG. 1, description will proceed to a high-density type FDD which is used as a component of a servo writer according to this invention. The illustrated high-density type FDD enables recording/reproducing of data to be carried out for a magnetic disk medium (which will later be described) of a large-capacity FD (not shown). The large-capacity FD is inserted into the high-density type FDD from an insertion direction indicated by an arrow A in FIG. 1. FIG. 1 shows a state where the large-capacity FD is inserted into the high-density type FDD. The large-capacity FD has a disk center axis (not shown).

The high-density type FDD comprises a main frame 11 having a main surface 11a and a disk holder table 12 which is rotatably supported on the main surface 11a of the main frame 11. The disk holder table 12 has a table center axis O which acts as the axis of the rotation. The inserted large-capacity FD is held on the holder disk table 12 so that the table center axis O coincides with the disk center axis. The disk holder table 12 is rotatably driven by a spindle motor 30 which will later be described. The spindle motor 30 is mounted on the main frame 11 with the spindle motor 30 put into a state embedded in a concave portion (which will later be described) of the main frame 11, thereby the magnetic disk medium in the large-capacity FD rotates at a desired rotation speed. In addition, the main frame 11 has a back surface (not shown) on which a printed-circuit board (not shown) is mounted. A number of electronic parts (not shown) are mounted on the printed-circuit board.

The high-density type FDD comprises a pair of magnetic heads (not shown) for reading/writing data from/in the magnetic disk medium in the large-capacity FD. The magnetic heads are supported via gimbals 14 with head carriage 15. A combination of the magnetic heads, the gimbals 14, the head carriage 15, a pair of voice coils 17 (which will later be described), a scale (not shown), a spring holder 18, and a spring 19 is called a carriage assembly. The head carriage 15 is disposed over the main surface 11a of the main frame 11 with a space left therebetween. The head carriage 15 supports the magnetic heads movably in a predetermined radial direction (i.e. a direction indicated by an arrow B in FIG. 1) with respect to the large-capacity FD. As described above, inasmuch as the head carriage 15 linearly moves in the predetermined radial direction B, the head carriage 15 is referred to a direct-acting head carriage.

The direct-acting head carriage 15 is supported and guided at both lower sides thereof by a pair of guide bars 16 which extend to directions in parallel with the predetermined radial direction B.

The direct-acting head carriage 15 is driven in the predetermined radial direction B by a voice coil motor which will presently be described. More specifically, the voice coil motor comprises the pair of voice coils depicted at 17 and a pair of magnetic circuits 20. The voice coils 17 are disposed on the direct-acting head carriage 15 at a rear side and are wound around driving axes in parallel with the predetermined radial direction B. The magnetic circuits 20 generate magnetic fields which intersect electric currents flowing in the voice coils 17. With this structure, by causing the electric currents to flow in the voice coils 17 in directions where the magnetic fields generated by the magnetic circuits 20 intersect, driving force occurs along the predetermined radial direction B extending to the driving axes on the basis of interaction between the electric currents and the magnetic fields. The driving force causes the voice coil motor to move the direct-acting head carriage 15 in the predetermined radial direction B.

The large-capacity FD has a shutter (not shown). The high-density type FDD includes a shutter drive mechanism for controlling the opening and closing of the shutter of the large-capacity FD, an ejector mechanism for ejecting the large-capacity FD from the high-density type FDD, and a carriage lock mechanism for locking the direct-acting head carriage 15 on and after completion of ejection operation.

The high-density type FDD includes a lever unit 50 which comprises an ejection lever 51 and a lock lever 52. The ejection lever 51 has a tip 51a. The ejection lever 51 serves as both of a component of the shutter drive mechanism and another component of the ejector mechanism. The lock lever 52 is disposed in the vicinity of the direct-acting head carriage 15 and is operable as a component of the carriage lock mechanism.

The ejector mechanism comprises an ejection push button 54, an ejection plate 55, and a pair of ejection springs 56 as well as the ejection lever 51. More specifically, the high-density type FDD includes a front panel (not shown) at a front end thereof. The front panel has a reception opening (not shown) for receiving the large-capacity FD. The high-density type FDD further includes a disk holder unit (not shown) for holding the large-capacity FD inserted into the high-density type FDD. The ejection push button 54 projects into an outer surface of the front panel. The ejection plate 55 locates the large-capacity FD inserted from the reception opening with the ejection plate opposed to one surface of the large-capacity FD. Each ejection spring 56 has an end engaged with the ejection plate 55 and another end engaged with the disk holder unit. In addition, the ejection plate 55 is provided with a rack 55a at an end thereof in a depth direction. The rack 55a engages with a pinion (not shown) which is rotatably supported on the main surface 11a of the main frame 11. The lever unit 50 is energized counterclockwise by a spring member 57.

It is presumed that the large-capacity FD is inserted into the high-density type FDD. In other words, the large-capacity FD is forced into the the high-density type FDD along the insertion direction indicated by the arrow A in FIG. 1. In this event, the tip 51a of the ejection lever 51 is engaged with a right-hand upper end of the shutter of the large-capacity FD. With movement of the large-capacity FD, the lever unit 50 rotates in a clockwise direction. As a result, the tip 51a of the ejection lever 51 opens the shutter.

It is assumed that the large-capacity FD is completely housed in the high-density type FDD. Under the circumstances, the large-capacity FD is held in the disk holder unit by a disk lock mechanism (not shown).

The illustrated spindle motor 30 is a type mounted on the main surface 11a of the main frame 11 in place of the back surface of the main frame 11. In particular, the spindle motor 30 is mounted on the main surface 11a with the spindle motor 30 embedded in the concave portion (not shown) of the main frame 11. The spindle motor 30 comprises a spindle shaft 31 which is rotatably supported with respect to the main frame 11 via a ball bearing (not shown) substantially perpendicular to the main surface 11a of the main frame 11. The spindle shaft 31 serves as the axis O of the rotation for the magnetic disk medium of the large-capacity FD inserted in the high-density type FDD. The disk holder table 12 is fixed to the spindle shaft 31 at an upper portion thereof. The disk holder table 12 has a main surface which extends to a direction perpendicular to a longitudinal direction (a direction of the axis O of the rotation) of the spindle shaft 31.

That is, the disk holder table 12 is rotatably supported on the main surface 11a of the main frame 11 and holds the large-capacity FD inserted in the high-density type FDD so that the table center axis O (the axis of the rotation) coincides with the disk center axis of the FD.

Although illustration is omitted, the large-capacity FD comprises the magnetic disk medium serving as a magnetic recording medium, and a case for covering the magnetic disk medium. The case comprises of an upper case having a main surface and a lower case having the bottom surface. In the bottom surface of the case, a circular aperture is formed at a center portion of the large-capacity FD. In the circular aperture is freely received a disk hub (a disk-shaped metal) for holding the magnetic disk medium. The disk hub has a disk center hole at a center portion thereof and a chucking hole (a disk driving oval hole) at a position eccentric with the center portion thereof. The disk center hole has substantially a rectangular shape and receives the spindle shaft 31. The chucking hole freely receives a chucking pin or a drive roller (which will later be described) therein.

The disk holder table has a diameter which is longer than that of the disk hub and which is shorter than that of the circular aperture of the case of the large-capacity FD.

The disk holder table 12 has a table driving oval hole 12a at a position corresponding to the chucking hole (the disk driving oval hole) of the large-capacity FD. The spindle motor 30 comprises the chucking pin (the drive roller) depicted at 32 which is freely received in the chucking hole of the large-capacity FD through the table driving oval hole 12a. The disk holder table 12 is mounted on a magnetic case 33 at a bottom surface thereof. The chucking pin 32 is rotatably and movably mounted in the magnetic case 33 with the chucking pin 32 urged upwardly. Accordingly, the chucking pin 32 moves downwardly or sinks in the disk holder table 12 if any load is applied to the chucking pin 32 downwards.

In the present invention, the high-density type FDD illustrated in FIG. 1 is used as the servo writer by processing a part thereof in the manner which will later described. That is, in order to integrate the direct-acting head carriage 15 with an actuator (which will later be described) of the servo writer by a connection rod (which will later be described) to form an integrated one, a portion enclosed in a broken circular line C in FIG. 1 will be processed. Inasmuch as the direct-acting head carriage 15 is driven by the actuator, no voice coil motor is required. In addition, an air spindle (which will later be described) is used in lieu of the spindle motor 30.

Figure 2:
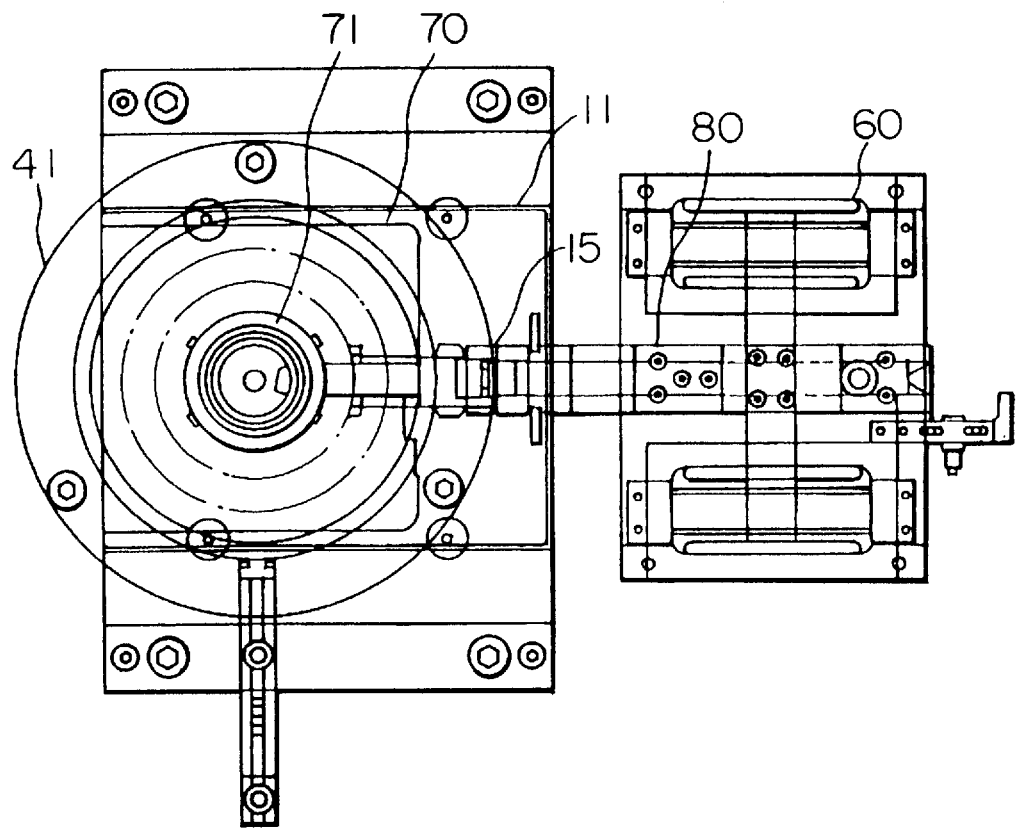
FIG. 2 is a plan view of a servo writer according to an embodiment of this invention.

Turning to FIG. 2, description will proceed to a servo writer according to an embodiment of this invention. The illustrated servo writer comprises the actuator depicted at 60, the air spindle depicted at 70, and the connection rod depicted at 80. The servo writer writes servo data in the magnetic disk medium depicted at 41 of the large-capacity FD with the case. Under the circumstances, the case of the large-capacity FD is fixed by the disk lock mechanism for use in the high-density type FDD illustrated in FIG. 1. As a result, it is possible to rotate the magnetic disk medium 41 of the large-capacity FD in stable.

In addition, inasmuch as the direct-acting head carriage 15 for use in the high-density type FDD illustrated in FIG. 1 is used as a head carriage for supporting a magnetic head for writing the servo data in the magnetic disk medium 41, there is no particular restriction on selecting the magnetic heads used as the servo writer.

The air spindle 70 comprises a hub chucking section 71 which includes an air spindle hub (not shown) where the chucking pin 32 used in the spindle motor 30 in the high-density type FDD illustrated in FIG. 1 is embedded. With this structure, it is possible to positively chuck the disk hub of the large-capacity FD without slipping of the magnetic disk medium 41 of the large-capacity FD.

The connection rod 80 for integrating the direct-acting head carriage 15 with the actuator 60 is preferably made of material of lightweight and of high rigidity to improve characteristics of a servo system. For example, the material of the connection rod 80 may be aluminum, magnesium alloy, titanium alloy, or the like. A method of combining the direct-acting head carriage 15 with the correction rod 80 may be a method of securing by screw, a method of bonding by adhesives, or a combined method of using a combination of these two methods. In a case where the direct-acting head carriage 15 is combined with the correction rod 80 by the above-mentioned combined method, it is possible to improve the rigidity and then to improve mechanical characteristics. The combined method is very important in a case of improving of the characteristics of the servo system.

After connecting the direct-acting head carriage 15 with the connection rod 80 mounted on the actuator 60, the following two follow-up methods can be adopted to smoothly move the actuator 60 by a voice coil motor (VCM) of the servo writer and to precisely position the direct-acting head carriage 15.

One follow-up method is a method of making the direct-acting head carriage 15 smoothly follow movement of the actuator 60 by using the guide bars 16 of the high-density type FDD illustrated in FIG. 1. In this event, in order to prevent the guide bars 16 from being subjected to excessive force, it is necessary to accurately adjust parallelism between the connection rod 80 mounted on the actuator 60 and the guide bars 16 by a specialized alignment jig (not shown). An error is not more than plus or minus 0.00045 μm in an offset between an upper magnetic head (not shown) and a lower magnetic head (not shown) which are supported by the direct-acting head carriage 15.

Another follow-up method is a method of making the direct-acting head carriage 15 smoothly follow movement of the actuator 60 by combining the direct-acting head carriage 15 with the connection rod 80 mounted on the actuator 60 alone without the guide bars 16 of the high-density type FDD illustrated in FIG. 1. This follow-up method is advantageous in that adjustment is carried out at a shot time because of no use of the guide bars 16. This follow-up method is realized by a method illustrated in FIGS. 3A–3C.

Figure 3A:
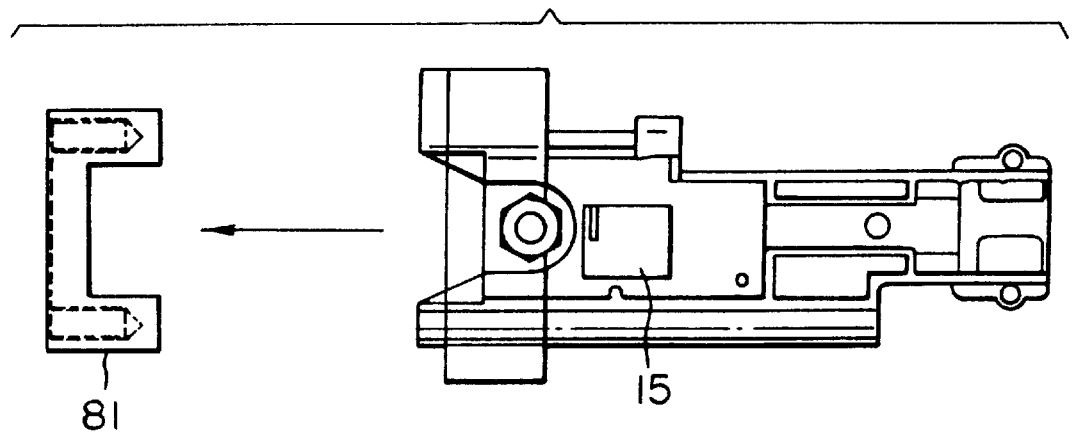
FIGS. 3A–3C are a plan views for describing a method of positioning a direct-acting head carriage after connecting the direct-acting head carriage with a connection rod mounted on an actuator.
Figure 3B:
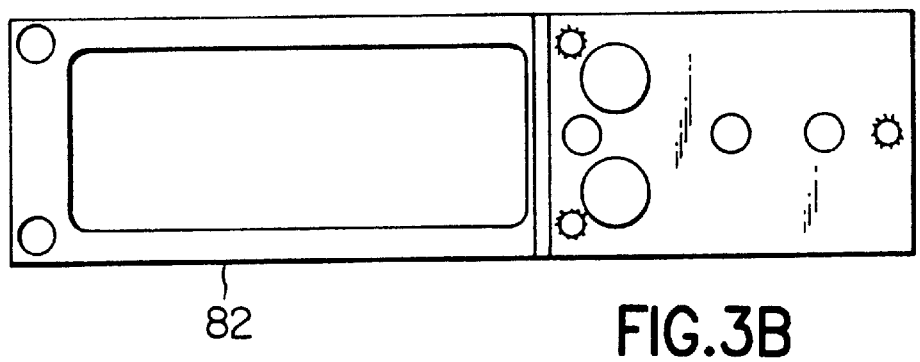
Figure 3C:
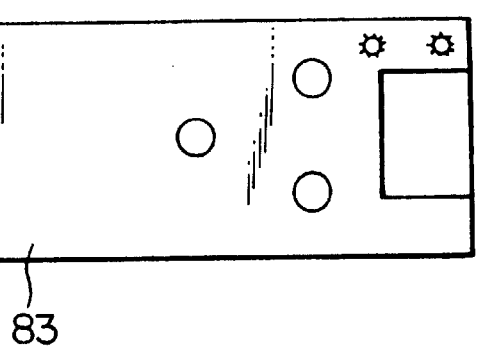

Turning to FIGS. 3A–3C, the connection rod 80 comprises a block 81 (FIG.3A), a carriage mounting arm 82 (FIG.3B), and an arm mounting section 83 (FIG. 3C). The block 81 is previously adhesive bonded to the direct-acting head carriage 15 at a rear part thereof to allow mounting the carriage mounting arm 82. After the block 81 is bonded to the direct-acting head carriage 15 at the rear part with adhesives, the direct-acting head carriage 15 is mounted on the carriage mounting arm 82. For this mounting, no jig is required. After the direct-acting head carriage 15 is mounted on the carriage mounting arm 82, it is mounted on the arm mounting section 83 on the actuator 60 using a jig (not shown).

Figure 4A:
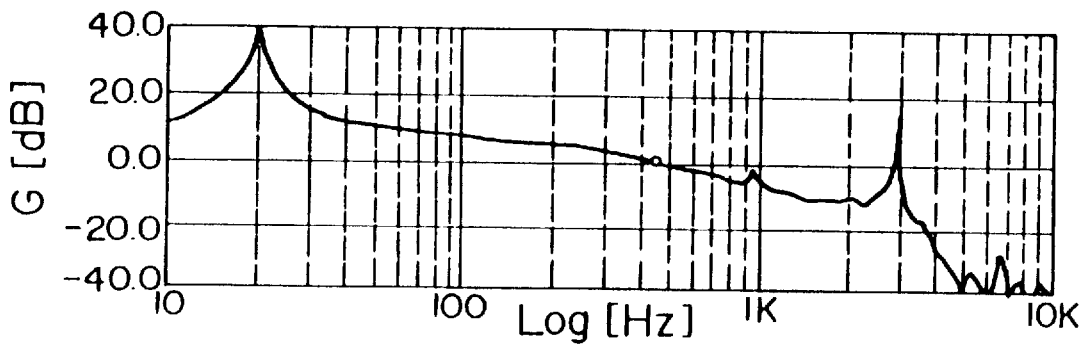
FIGS. 4A and 4B collectively show a Bode diagram of a servo system in a conventional servo writer.
Figure 4B:
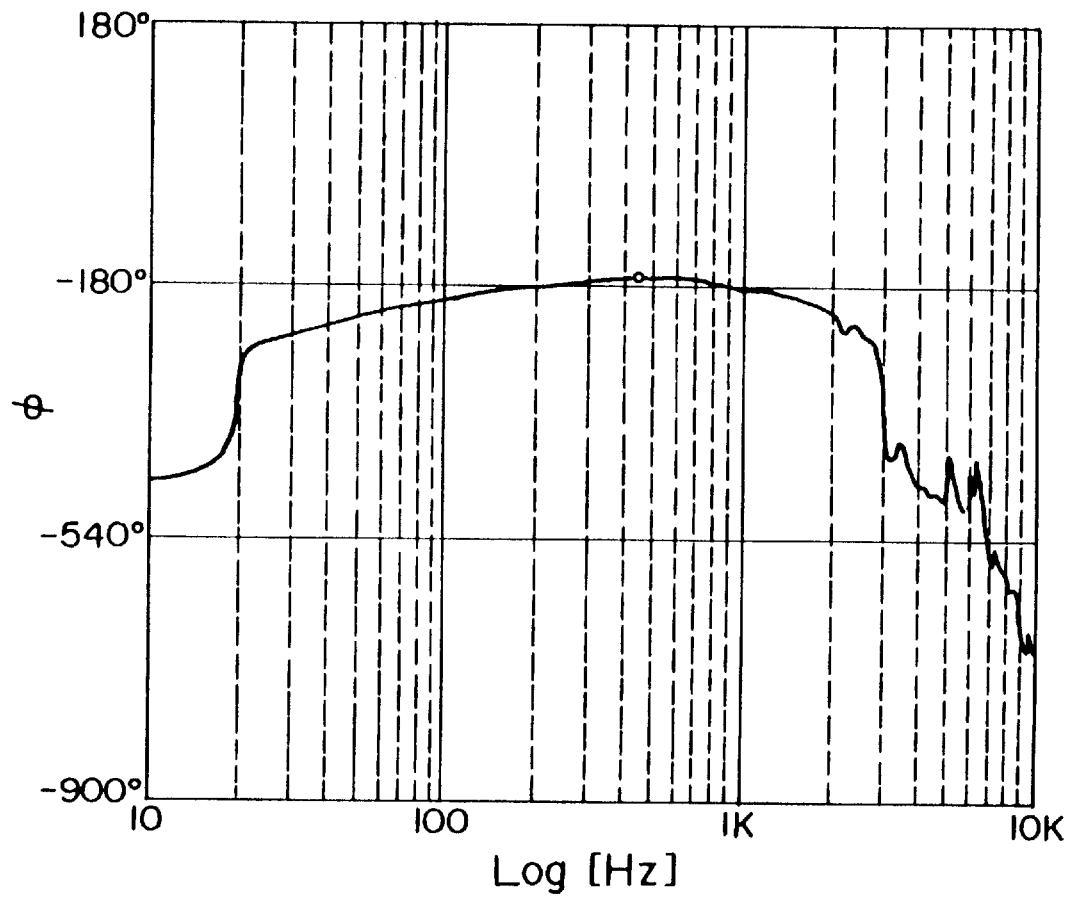

FIGS. 4A and 4B collectively show a Bode diagram of a servo system in a conventional servo writer. FIG. 4A represents a gain curve while FIG. 4B represents a phase curve. As is well known in the art in control theory, if a gain G is negative in decibel value [dB] at a phase intersection (intersection of the phase and a line of −180°), the servo system is stable. If the gain G is positive in decibel value [dB] at the phase intersection, the servo system is unstable. In addition, if a phase difference is larger than −180° at a gain intersection (intersection of the phase and a line of 0 [dB] or of the gain of one), the servo system is stable. If the phase difference is less than −180° at the gain intersection, the servo system is unstable. As is apparent from FIGS. 4A and 4B, in the servo system of the conventional servo writer, the phase difference is less than −170° at the gain intersection and a phase margin is less than 10°. In addition, a gain margin has little at the phase intersection. Furthermore, the gain exceeds 0 [dB] at a frequency of resonance point. As a result, it is impossible to adequately obtain the gain margin, the phase margin, and the frequency of the resonance point.

Figure 5A:
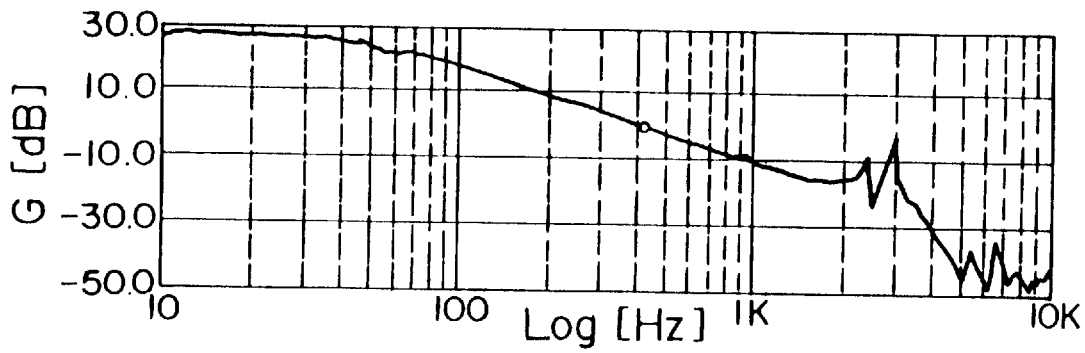
FIGS. 5A and 5B collectively show a Bode diagram of a servo system in a conventional servo writer illustrated in FIG. 2.
Figure 5B:
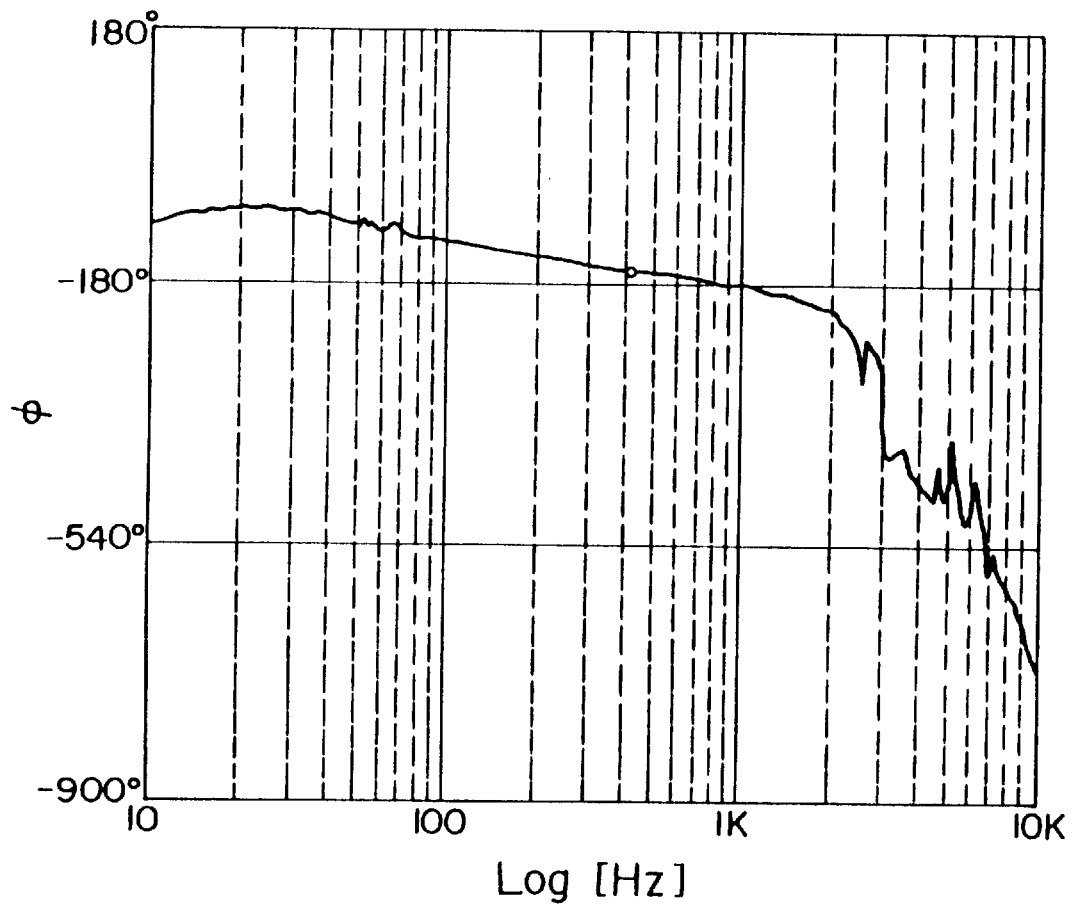

FIGS. 5A and 5B collectively show a Bode diagram of the servo system in the servo writer illustrated in FIG. 2 that is manufactured by integrating the direct-acting head carriage 15 with the actuator 60 by the connection arm 80 and by positioning the direct-acting head carriage 15 exactly. FIG. 5A represents a gain curve while FIG. 5B represents a phase curve. In comparison with the Bode diagram in the servo system of the conventional servo writer illustrated in FIGS. 4A and 4B, as apparent from FIGS. 5A and 5B, it is possible to adequately obtain the gain margin, the phase margin, and the frequency of the resonance point in the servo system of the servo writer illustrated in FIG. 2. That is, it is possible to improve the characteristics of the servo system of the servo writer illustrated in FIG. 2 in contrast with that of the servo system of the conventional servo writer. In addition, it is possible for the servo writer according to this invention to easily improve accuracy of mechanical positioning in contrast with the conventional servo writer. This is because the direct-acting head carriage 15 is integrated with the actuator 60 by the connection rod 80.

In the servo writer illustrated in FIG. 2, the direct-acting head carriage 15 for use in the high-density type FDD illustrated in FIG. 1 is used as it is and a particularly designed jig is used. As a result, it is possible to prevent mechanical force from acting on the magnetic disk medium 42 at inner, intermediate, and outer circumferences thereof. Accordingly, the servo writer according to this invention is not affected by modulation on writing of the servo data in the magnetic disk medium 41. In addition, it is possible to achieve exact chucking of the disk hub of the large-capacity FD by using, as the air spindle hub, the chucking pin 32 used in the high-density type FDD illustrated in FIG. 1 and by fixing the case of the large-capacity FD with the disk lock mechanism used in the high-density type FDD illustrated in FIG. 1. Accordingly, it is possible to positively inhibit the effect of runout.

Although this invention has thus far been described in conjunction with a preferred embodiment thereof, it should now be readily possible for those skilled in the art to put this invention into various other practical uses.

What is claimed is:

1. A method of writing servo data on a magnetic disk medium of a large-capacity flexible disk using a magnetic head, the magnetic disk medium of said large-capacity flexible disk having a track width which is narrower than that of a magnetic disk medium of a small-capacity flexible disk, said method comprising the steps of:

using, as a head carriage for supporting said magnetic head, a direct-acting head carriage driven by a linear motor, said direct-acting head carriage being used in a high-density type flexible disk drive for carrying out data recording and reproducing operations to and from the magnetic disk medium of said large-capacity flexible disk;

integrating said direct-acting head carriage with an actuator of a servo writer by a connection rod to form an integrated direct-acting head carriage and actuator; and writing the servo data on the magnetic disk medium using the integrated direct-acting head carriage and actuator.

2. A servo writer for writing servo data on a magnetic disk medium of a large-capacity flexible disk using a magnetic head, the magnetic disk medium of said large-capacity flexible disk having a track width which is narrower than that of a magnetic disk medium of a small-capacity flexible disk, said servo writer comprising:

a direct-acting head carriage which supports said magnetic head, said direct-acting head carriage being driven by a linear motor and being used in a high-density type flexible disk drive for carrying out data recording and reproducing operations to and from the magnetic disk medium of said large-capacity flexible disk; and a connection rod for integrating said direct-acting head carriage with an actuator of said servo writer.

3. The method of writing servo data on a magnetic disk medium of a large-capacity flexible disk using a magnetic head according to claim 1, wherein said step of using a direct-acting head carriage comprises linearly moving said direct-acting head carriage in a predetermined radial direction.

4. The method of writing servo data on a magnetic disk medium of a large-capacity flexible disk using a magnetic head according to claim 1, wherein said step of integrating said direct-acting head carriage with an actuator comprises bonding said direct-acting head carriage to a block, mounting said direct-acting head carriage on a carriage mounting arm, and mounting said direct-acting head carriage on an arm mounting section on said actuator.

5. The servo writer for writing servo data on a magnetic disk medium of a large-capacity flexible disk using a magnetic head according to claim 2, wherein said direct-acting head carriage comprises a support which is linearly movable in a predetermined radial direction.

6. The servo writer for writing servo data on a magnetic disk medium of a large-capacity flexible disk using a magnetic head according to claim 2, wherein said connection rod comprises a block bonded to said direct-acting head carriage, a carriage mounting arm mounted on said direct-acting head carriage, and an arm mounting section on said actuator to which said direct-acting head carriage is mounted.

* * * * *